United States Patent [19]
Jermyn et al.

[11] Patent Number: 5,971,320
[45] Date of Patent: Oct. 26, 1999

[54] HELICOPTER WITH A GYROSCOPIC ROTOR AND ROTOR PROPELLERS TO PROVIDE VECTORED THRUST

[76] Inventors: Phillip Matthew Jermyn, South View Rafford Forres, Morayshire, United Kingdom; Steven Martin Davis, 25266 N.W. Dixie Mountain Rd., Scapoose, Oreg. 97056

[21] Appl. No.: 08/918,305

[22] Filed: Aug. 26, 1997

[51] Int. Cl.⁶ .................................................. B64C 27/08
[52] U.S. Cl. .................. 244/17.25; 416/111; 244/17.23; 446/37
[58] Field of Search ............................. 244/17.11, 17.13, 244/17.23, 17.27, 17.25; 416/23, 24, 111, 120, 130, 99; 446/36, 37

[56] References Cited

U.S. PATENT DOCUMENTS

| | | |
|---|---|---|
| 1,056,668 | 3/1913 | Happich, Jr. . |
| 1,697,009 | 1/1929 | Isacco . |
| 2,589,826 | 3/1952 | Larsen . |
| 3,065,799 | 11/1962 | McCarty, Jr. . |
| 3,181,816 | 5/1965 | Pfleiderer .............................. 244/17.23 |
| 3,246,861 | 4/1966 | Curci . |
| 3,360,219 | 12/1967 | Wigal . |
| 3,762,669 | 10/1973 | Curci ....................................... 416/111 |
| 4,161,843 | 7/1979 | Hui . |
| 4,482,110 | 11/1984 | Crimmins, Jr. ............................ 416/99 |
| 5,082,079 | 1/1992 | Lissaman et al. . |
| 5,297,759 | 3/1994 | Tilbor et al. . |
| 5,409,183 | 4/1995 | Gunsallus ................................... 416/24 |
| 5,634,839 | 6/1997 | Dixon . |
| 5,672,086 | 9/1997 | Dixon . |

FOREIGN PATENT DOCUMENTS

| | | |
|---|---|---|
| 281736 | 1/1928 | United Kingdom . |
| 1227042 | 6/1972 | United Kingdom . |

*Primary Examiner*—Galen L. Barefoot
*Attorney, Agent, or Firm*—ipsolon LLp

[57] ABSTRACT

A model helicopter creates lift using rotor propellers mounted to the rotor arms of a gyroscopic rotor assembly. A controller converts front-back, and left-right inputs into speed control signals used to vary the speeds of the rotor propellers at selected positions of the rotor assembly as it rotates. The varying speed of the rotor propellers at selected rotor positions produces thrust vectors at those positions. The resultant thrust vector determines the direction of the helicopter's flight and enables it to pitch and roll in response to the front-back and left-right inputs. The rotor assembly can have two or more rotor arms, each with a propeller. The helicopter provides left-right yaw control with a yaw propeller on the helicopter body. Electric motors, or motors using other conventional power and speed control methods, can be used to drive the rotor and yaw propellers. Power and speed control signals can be transferred to the rotor motors via commutators on the helicopter body and rotor assembly that make electrical contact as the rotor assembly rotates.

12 Claims, 2 Drawing Sheets

HELICOPTER WITH A GYROSCOPIC ROTOR AND ROTOR PROPELLERS TO PROVIDE VECTORED THRUST

FIELD OF THE INVENTION

The invention relates to a vertical take off aircraft.

BACKGROUND OF THE INVENTION

Conventional helicopters vary the pitch of rotor blades to provide directional control. The rotor blades rotate in a plane and are shaped to provide lift. The rotor blades are coupled to the helicopter through a complex mechanical linkage that enables the pilot to control the pitch of the blades. By varying the pitch of rotating blades the pilot can roll the helicopter left and right and pitch forward and backward. The mechanical structure for varying the pitch of the rotor blades is complex, difficult to manufacture, and impractical for use in very small model helicopters.

SUMMARY OF THE INVENTION

The invention provides an improved helicopter with a gyroscopic rotor assembly having rotor propellers that generate a vectored thrust. The helicopter creates lift and provides directional control by driving propellers mounted to the rotor arms of the rotor-mounted assembly. The rotor arms do not have to provide lift, but rotate to provide gyroscopic stability and to facilitate directional control of the helicopter. As the rotor spins, the helicopter varies the speeds of the rotor propellers at selected positions to create thrust vectors. By controlling the speeds of the propellers, the helicopter provides pitch and roll control. A yaw propeller on the body provides yaw control. The helicopter design is particularly suited for use in small remote-controlled helicopters, but can also be adapted for a variety of other applications.

In one embodiment of the helicopter, a controller converts front-back, and left-right inputs into speed control signals used to vary the speeds of the rotor propellers. The varying speeds of the rotor propellers at selected rotor positions produce thrust vectors at those positions. The resultant thrust vector determines the direction of the helicopter and enables it to pitch and roll in response to the front-back and left-right inputs. The rotor assembly can have two or more arms, each with a rotor propeller mounted at the end.

The rotor and yaw propellers can be driven by motors using any of a variety of speed control methods and power sources. In one embodiment, power and speed control signals are delivered to electrical motors on the rotor arms via a commutator on the helicopter body and brushes on the rotor assembly that make contact as the rotor assembly rotates. The motors receive power and speed control through the same signal. One implementation of the commutator comprises a commutator ring, with three or more sectors at selected positions, to deliver power and speed control signals to the brushes associated with each rotor arm. Three or more sectors can be used to deliver the power and speed control signals. A controller takes front-back (pitch) and left-right (roll) inputs and resolves them into power and speed control for each sector. The control signals for each sector generate a thrust vector at rotor arm positions corresponding to the sector positions.

It is possible to separate the power and speed control signals and to deliver the control signals in different ways to the rotor motors. For example, a controller can manage speed control by sending control signals to electronic switches on the rotor assembly. The power to each motor can be applied independently from the control signals on separate signal paths. One way to achieve this is to use separate slip rings for delivering power and speed control signals to the rotor motors.

The speed control and power for driving the motors can also use different types of power sources. For example, the speed control can be electrical or mechanical, and the power can be a separate source of electric or mechanical power. If the motors are not electric, but instead, use some other form of power such as internal combustion, the motors can provide their own power, and the speed control signals can be delivered separately using electrical or mechanical signals.

The shape and size of the helicopter can vary substantially. Model helicopters have rotor assemblies with diameters in the range of 1 to 2 feet. However, helicopters for other applications can be constructed with smaller or larger rotor assemblies. The configuration of the body is not particularly important. It should provide a reference for pitch and roll control and a sufficient yaw-damping factor. However, its shape need not look like a conventional helicopter, e.g., it can be round, shaped-like box, or some other arbitrary shape.

One embodiment is a remote-controlled helicopter that receives speed control signals via a tether connecting a remote controller and electrical components on the helicopter. It is also possible to implement a wireless remote control using conventional wireless communication transmitters and receivers to send speed control signals to the helicopter. The tethered version of the remote-controlled helicopter is sufficiently small, light, and safe (the rotor has a low RPM) to be flown indoors (e.g., small enclosures like a telephone booth, even less than 3×3×3 cubic feet).

Further advantages and features of the invention will become more apparent from the following detailed description and accompanying drawings.

DETAILED DESCRIPTION

Figure 1:
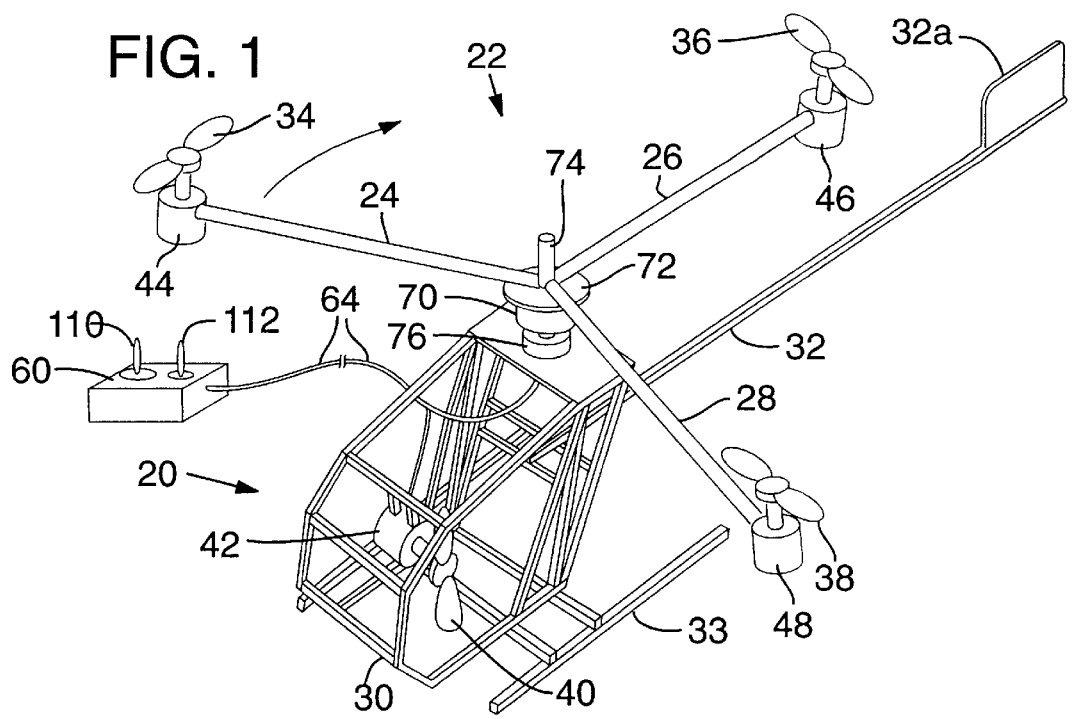
FIG. 1 is a perspective view of one embodiment of a model helicopter designed according to the invention.

FIG. 1 is a perspective view of one embodiment of a model helicopter 20 designed according to the invention. The structural components of the helicopter include a rotor assembly 22 with three rotor arms 24, 26, 28 and a frame 30 with a tail section 32 (with an optional tail fin 32a). The frame includes a landing structure 33 to support the helicopter at rest, at landing and during takeoff.

Propellers 34, 36, 38, mounted at the tip of each rotor arms 24–28, provide upward thrust and directional control. The rotor arms 24–28 provide no lift, but they rotate to provide gyroscopic stability and to facilitate directional control. A yaw propeller 40 mounted on the frame 30 controls the yaw of the helicopter. Motors 42, 44, 46, 48 drive the 3 rotor propellers and the yaw propeller.

The yaw propeller 40 is bi-directional to provide left and right yaw control. Unlike a conventional helicopter, the frame 30 experiences no counter-torque due to the rotation of the rotors because the rotor assembly is self-powered. In practice, the yaw control has a small bias to negate the effect of the drag in the bearing that allows the rotor assembly to rotate.

The rotor propellers 34–38 drive the helicopter forward and backward (pitch) and cause it to bank left or right (roll) by generating a thrust at selected positions of the rotor arms. The term "vectored thrust" means that the helicopter's controller selectively varies the speeds of the rotor propellers such that the vector sum of the thrust vectors from each propeller produces a resultant vector in a desired direction. The magnitude of each propeller's thrust vector is controlled via the magnitude of the power supplied to the propeller motor (such as a DC voltage to a DC propeller motor). The direction of the each propeller's thrust vector is controlled by selecting the position of the rotor arm at which the change (increase or decrease) in the associated propeller speed occurs. The sum of the thrust vectors generated by varying the speeds of the rotor propellers at selected positions determines the direction of flight of the helicopter, namely its pitch and roll movement.

For complete control in all directions, at least three separate thrust vectors are required. In the model depicted in FIG. 1, a remote controller 60 can adjust four force vectors: front, back, left, right. In this particular implementation, the controller causes the helicopter to move in any of these four directions by creating a resultant thrust vector in the desired direction of motion. For example, to generate forward motion, the controller increases the rear thrust vector magnitude and reduces the front thrust vector magnitude. As described further below, the resultant vector can be generated by three or more separate vectors. These vectors can be generated using two or more rotor arms, each having a propeller.

In the embodiment shown in FIG. 1, the remote controller provides control signals via a thin bundle of wires called a tether 64. This tether provides control signals to the three rotor propellers and the yaw propeller. In this particular embodiment, the control signals and power are actually combined.

To supply power to the rotor motors 44–48, the helicopter 20 includes a commutator housing 70, including a rotor commutator such as brushes that make electrical contact with a commutator on the helicopter body (the body commutator). One implementation of the body commutator includes three or more electrically isolated sectors formed in a commutator ring. The commutator ring transfers electric power from the tether 64 to the three rotor motors via the brushes in the commutator housing 70. The commutator housing 70 is mounted to the rotor assembly and includes one brush for each rotor arm. As the rotor assembly rotates, the brushes make contact with the sectors of the commutator ring, which is fixed to the helicopter frame.

When a brush physically contacts a sector in the commutator assembly, it receives electric power through the sector. The sectors and rotor arms are positioned such that the remote control can vary the speed of a rotor propeller at predetermined rotor arm positions. Specifically, as each rotor arm brush makes electrical contact with a fixed sector, it receives power at its current position. As described below, there actually is some delay between a change in the power and the change in the propeller speed. By varying the power, the controller varies the speed of each propeller at the position of its rotor arm when the brush on the rotor arm makes contact with a sector. Further details of the structure and operation of the commutator ring and rotor assembly are provided below.

It is important to emphasize that the commutator ring is only one way of conveying speed control to the rotor motors at selected positions of the rotor arms. It is possible to separate the speed control and power signals for the rotor motors. Later, we describe a number of other alternatives.

The coupling between the commutator housing 70 and helicopter frame can be implemented in a variety of ways. In the embodiment shown in FIG. 1, the rotor arms 24–28 are mounted to a hub 72, which in turn, is fixed to a spindle 74. The spindle 74 rides in a bearing 76 mounted to the frame 30. As an alternative, the bearing can be mounted at the hub 72 of the rotor assembly and the spindle can be fixed to the frame 30 of the helicopter.

Figure 2:
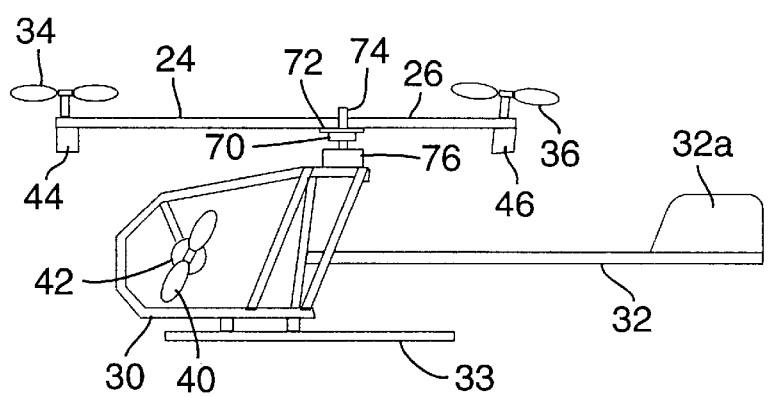
FIG. 2 is a side view of the model helicopter shown in FIG. 1.
Figure 3:
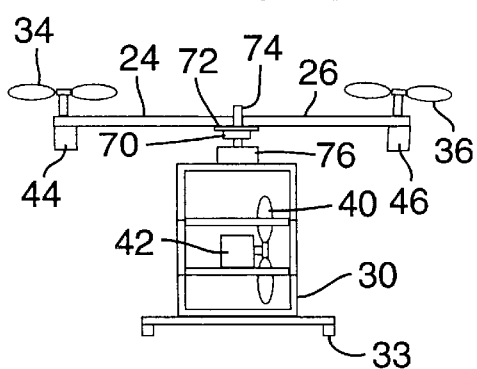
FIG. 3 is a front view of the model helicopter shown in FIG. 1.

FIGS. 2 and 3 illustrate additional views of the helicopter in FIG. 1. FIG. 2 is a side elevational view of the helicopter, while FIG. 3 is a front elevational view. The reference numbers in FIGS. 2 and 3 correspond to the same parts as described above for FIG. 1.

FIGS. 2 and 3 illustrate the structural relationship of the commutator housing 70 and the hub 72 of the rotor assembly 22. The spindle 74 is mounted to the hub 72 and rotates in the bearing 76 mounted to the frame 30. The commutator housing 70 is attached below the hub 72 of the rotor assembly. The commutator ring (shown in more detail in FIGS. 4B and 4C) is fixed to the helicopter frame 30 and makes contact with the brushes in the rotor assembly.

There are a number of different ways to mount the rotor assembly to the frame so that it can rotate in a fixed plane. One alternative way is to attach the bearing to the hub of the rotor assembly. In this design, the bearing on the rotor assembly would rotate on a fixed spindle mounted to the frame.

As shown in the side view of FIG. 2, the yaw propeller 40 is located near the front of the helicopter. In this embodiment, the yaw propeller 40 is mounted to the shaft of the yaw motor 42. The yaw motor 42 is fixed to the frame. In this design, the yaw motor 42 is located near the front of the fuselage (away from the center of gravity). The weight of the tail section 32 balances the weight of the motor such that the helicopter body (frame and tail) has a useful turning moment for yaw control.

It is worth noting that the yaw propeller can also be mounted on the tail section 32. One way to drive a yaw propeller on the tail section is to position the motor near the center of gravity of the helicopter in the fuselage and fit a belt around the shaft of the propeller and that of the yaw motor.

The structural components including the rotors 24–28 frame 30, tail 32 are made of a rigid yet light material, such as balsa wood, molded plastic, styrofoam, or combinations of these materials. The propellers 42–48 are made of a light, yet rigid and durable material such as plastic.

The helicopter can vary in size. The rotor assemblies of model helicopters are typically 10 inches to 2 feet in diameter, but the diameter can be considerably smaller or larger. The total weight of a model helicopter having a rotor assembly with a diameter of about 10 inches is approximately 2 ounces. The majority of this weight is due to the four motors, which are just under one-half ounce each. The frame is about 7 grams. The tether can be at least 30 feet long. The tether wires should be as light as possible. However, as the gauge of the wire increases, so does its resistance. To increase range, the wire size can be increased or the power supply in the remote controller can be increased.

A model helicopter using the illustrated design can be flown indoors. The helicopter design shown in FIGS. 1–3 can be made small and light enough to be flown in confined spaces such as small rooms or closets, narrow shafts, and even a confined enclosure like a telephone booth. Another factor in the ability to operate indoors is safety. As explained further below, the RPM of the rotor assembly is quite slow, since it is not used to generate lift. Thus, the rotors are not likely to cause damage when flown indoors.

The shape and structure of the frame and tail can vary and are not particularly critical to the design of the helicopter. The frame should preferably have some distinguishing characteristic to enable the user to identify the front and back of the helicopter. In addition, the body should have enough mass and length to provide damping stability. To be stable, the body of the helicopter (e.g., the frame and tail in this embodiment) should have a sufficiently large damping factor to lessen the impact of random perturbations. A longer tail section tends to give the user a reference for direction control and provides a sufficient damping factor to provide better yaw control.

With the above-design considerations in mind, it is possible to design the body of the helicopter in many different shapes and sizes. For example, it could be made to look like a round flying saucer. In this type of design, a tail fin, oriented vertically, could be used to provide stability. Additional tail fins could be spaced about the perimeter of the body to provide more stability. The yaw propeller could be mounted within a hollow nose section or mounted to a tail section or tail fin. A variety of other designs are possible within the broad design constraints outlined above.

Figure 4A:
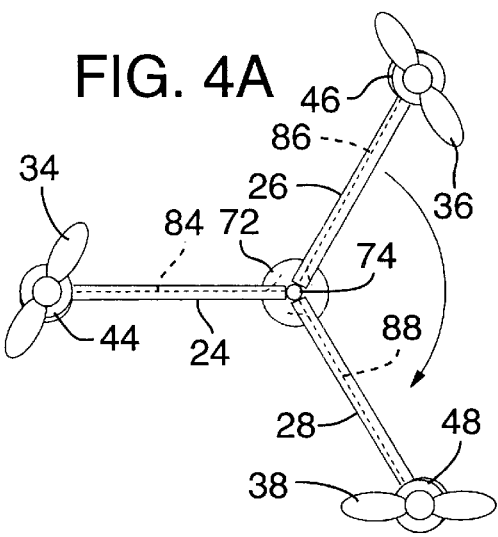
FIG. 4A is a top view of the rotor in the model helicopter in FIG. 1.
Figure 4B:
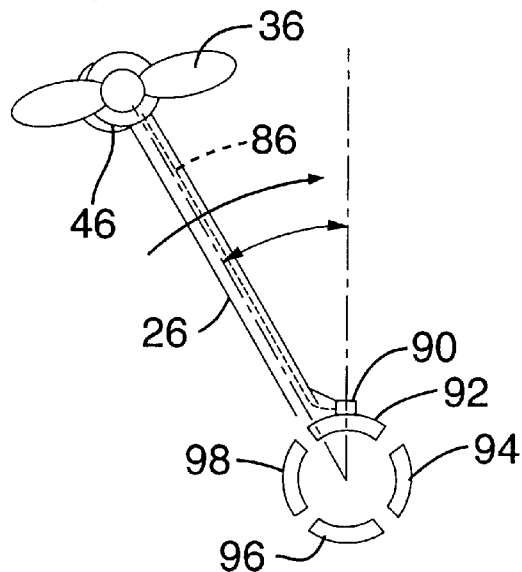
FIG. 4B shows an enlarged view of a four sector commutator ring of the rotor in FIG. 4A to illustrate the electrical connection between a rotor and the four sector ring.
Figure 4C:
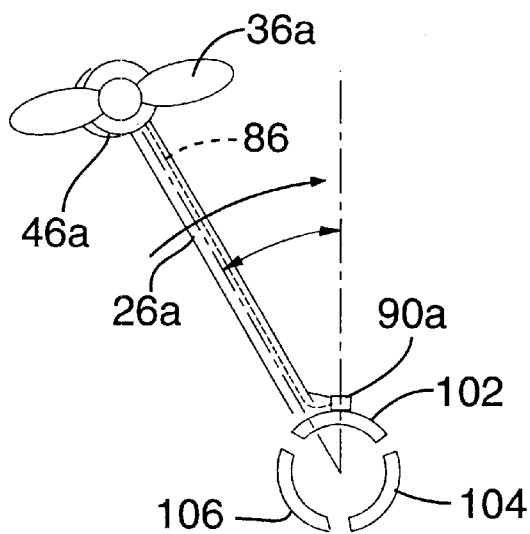
FIG. 4C shows an enlarged view of a three-sector commutator ring of the rotor in FIG. 4A to illustrate the electrical connection between the rotor and the three-sector ring.

FIGS. 4A–C are diagrams illustrating features of rotor assemblies for the model helicopter shown in FIG. 1. As shown in the top view of the rotor assembly in FIG. 4A, the rotor arms 24–28 are spaced approximately 120 degrees apart. The rotor arms are mounted together at the hub 72, which is attached to the spindle 74. The rotor motors 44–48 are mounted to the end of each rotor arm 24–28. The motors used in this embodiment are DC motors weighing just under one-half ounce (about 7/16 ounce). These types of DC motors are commonly found in slot cars. Other types of motors (even non-electrical motors) can be used provided they are sufficiently light-weight, have low inertia, and are responsive to requests for a change in speed. The response time is dependent, in part, on the manner in which the speed control mechanism delivers speed control signals to the motor.

A pair of wires 84, 86, 88 on each rotor arm 24–28 transfer speed control signals from a commutator at the hub 72 (e.g., brush 90, 90a in FIGS. 4B and 4C) to the rotor motors 44–48 and provides a return path to a common return. The common return, in this embodiment, is provided via the spindle 74, but could also be provided via a slip ring. To use a slip ring in this manner, each rotor arm would have a second brush used for the return, and this second brush would be in contact with a stationary slip ring on the frame 30. The electrical control is described further below with reference to the alternative commutator ring designs shown in FIGS. 4B and 4C.

The rotor propellers are mounted directly to the shafts of the motors. Each of the rotor motors is tilted slightly such that the lift generated by the propellers causes the rotor assembly to rotate. The propellers are oriented such that the rotor assembly rotates in a clock-wise direction. When the rotor propellers rotate, they also contribute to the rotation of the rotor assembly due to the counter-torque that they generate. In this particular embodiment, this counter-torque is not sufficient to create a sufficient RPM to enable the rotor to achieve gyroscopic stability. Thus, the tilt of the propellers provides an additional force vector to cause the rotor assembly to rotate.

The RPM of the rotor assembly can extend over a fairly broad range. The rotor speed attained during the operation of the helicopter shown in FIGS. 1–3 is approximately 100 RPM, but this can vary depending on the implementation. The lower limit is related to the gyroscopic stability of the helicopter: the RPM of the rotor assembly must be sufficient to provide gyroscopic stability. The upper limit is related to the response delay of the propellers to a request to change speed: the RPM must be slow enough to enable each propeller to actually change speed by the time the associated rotor arm reaches a predetermined position in response to a speed control signal requesting a change in speed.

As described above, the rotor assembly acts as gyroscopically rotor, providing a vectored thrust due to the varying speeds of the rotor propellers. The rotor assembly itself does not have to provide any lift to enable the helicopter to fly, and in this embodiment, does not provide any lift. The rotor propellers provide all of the lift by upward thrust. Note that the propeller thrust is substantially upward due to the slight tilt of each rotor motor.

Due to the effect of gyroscopic precession, an upward thrust at a rotor arm angular position of, say 0 degrees actually causes a force vector at an angular position of 90 degrees. An additional offset is also necessary in this embodiment due to the delay in the response of the motor to a change in supply voltage. In the embodiment shown in FIG. 4, the offset for precession is addressed by adjusting the commutator ring by 90 degrees. This 90-degree offset can be addressed either in the controller design or physically adjusting the position of the commutator ring.

The offset due to the delay in the motor response is about 30 degrees in the illustrated helicopter. This offset is addressed by adjusting the position of the brush (90, 90a) to be roughly 30 degrees ahead of the rotor arm 86 associated with the brush. This is illustrated in more detail in FIGS. 4B and 4C.

FIGS. 4B and 4C illustrate two alternative embodiments of a commutator ring assembly and its relationship with a rotor brush (e.g., 90, 90a) on the rotor assembly. FIG. 4B illustrates a commutator ring with four sectors 92–98, while FIG. 4C illustrates a commutator ring with only three sectors 102–106. The letter "a" is added to the reference numbers in FIG. 4C to distinguish the two alternative designs. The rotor assembly design can be the same in both designs regardless of the number of sectors. In addition, the rotor assembly in either design can include 2 or more rotors.

The number of commutator ring sectors corresponds to the number of angular positions of the rotor assembly where the controller 60 can vary the speeds of the brush propellers. As each rotor comes in contact with a sector, it receives a power that controls the speed of the motor at the end of the rotor arm. The use of four sectors is convenient because the number four corresponds to the number of directions that a user intuitively thinks of to control the helicopter, namely, front, back, left, and right. The controller 60 can make the helicopter roll to the right or left by creating a speed differential between the right and left sectors so that there is a resultant thrust vector to the right or left. Similarly, the controller 60 can make the helicopter pitch to the front or back by creating a speed differential between the front and back so that there is a resultant thrust vector to the front or back. The controller 60 illustrated in FIG. 1, for example, makes the helicopter roll to the right by increasing the power through the left sector and decreasing the power through the right sector.

It is important to note that any combination of three or more thrust vectors can be used to provide directional control of the rotor assembly. Thus, it is possible to use only three sectors or more than four sectors.

Preferably, though not required, the controller 60 should allow the user to provide directional control input in four directions: front to pitch forward, back to pitch backward, right to roll to the right, and left to roll to the left. Four directional inputs from a control device, such as a joystick, can be converted into drive signals for three or more thrust vectors, and specifically, for power supplies delivered to three or more sectors in the commutator ring. The controller 60 can be designed to convert front, back, right and left inputs to four power supplies as described generally above. Namely, to move in a desired direction, increase the power to one sector and decrease the power by the same amount to the opposite sector.

The four inputs can also be converted into three power supplies for the three sector design shown in FIG. 4C. In one implementation using the three-sector ring, sector 102 is associated with the front of the helicopter, and sectors 104 and 106 are back-right and back-left, respectively. To provide front-back control, the controller 60 takes front-back inputs (e.g.,forward or backward movements of the joystick 110 in FIG. 1) and generates a speed control signals that changes the voltage to the front sector 102 relative to the back two sectors 104, 106. Specifically, the voltage change to the front sector is twice the voltage change to each of the back sectors. To move forward, the scale factors on the front, back-right, and back-left sectors are (−1, ½, ½). To move backward, the scale factors on the front, back-right, and back-left sectors are (1, ½, −½).

To provide right-left control, the controller 60 takes right-left inputs (e.g., movements of the joystick 110 right or left) and generates speed control signals that vary the voltage to the back two sectors 104, 106 at equal, but opposite scale factors. The controller increases one back sector and decreases the other back sector by equal amounts. To move left, the scale factors on the back-right and back-left sectors are (1,−1). To move right, the scale factors on the back-right and back-left sectors are (−1,1). The components of the vectors generated at the back-left and back-right sectors that are at 180 degrees (directly backward, where the front sector is theoretically at 0 degrees) cancels out. Thus, right-left control can be implemented simply by varying the supply voltages to the back left and back right.

From the discussion above, it should be apparent that more than four sectors can be used. The thrust vectors associated with each sector can be summed to provide a resultant vector in a desired direction. Moreover, it is also possible to use only two rotor arms or more than three rotor arms. With more rotor arms, the speeds of the rotor propellers are still controlled at the same positions.

As introduced above, the tether 64 includes wires that transfer power from the remote controller 60 to the helicopter 20. The number of wires depends on the number of sectors in the commutator ring. For example, the four sector design shown in FIG. 4B uses seven wires total: one for each of the four sectors, one common return (ground) for the rotor motors, and two for the yaw motor (one speed control and the return). Note that all of the motors 42–48 do not share a common return in this implementation. The resistance in the common return of the rotor motors creates a voltage drop when current passes through it. This voltage drop would add interference to the yaw speed control, if all motors shared a common return.

The three-sector design shown in FIG. 4C uses one less wire because it has one less sector. It has the added advantage that the three-sector commutator ring is readily available because the three-sector configuration is commonly used in electrical motors for other applications.

The electrical path for transferring power from the tether to a rotor motor passes through a commutator sector (e.g., 92, 102) to a brush (e.g., 90, 90a) on the rotor. A wire in the tether carries the power to a sector in the commutator ring (92 or 102 in FIGS. 4A and 4C. The sector 90, 102 comes in contact with the brush 90, 90a as the rotor assembly rotates. Wiring 86 carries the power from the brush 90, 90a to the rotor motor 46 and carries the return back to a return commutator attached to the hub 72.

In one embodiment, the spindle 74 is a metal part (e.g., copper) that serves as the return commutator, connecting the rotor motors to the common return wire on the tether. It makes electrical contact with another commutator (a brush) in the bearing 76 (see FIGS. 2 and 3). Note that the bearing can also be part of the rotor assembly. In this case, the brush in the bearing makes contact with the fixed spindle as the rotor assembly rotates. An alternative design is to use a slip ring instead of the spindle 74 as the return as described above.

Figure 5:
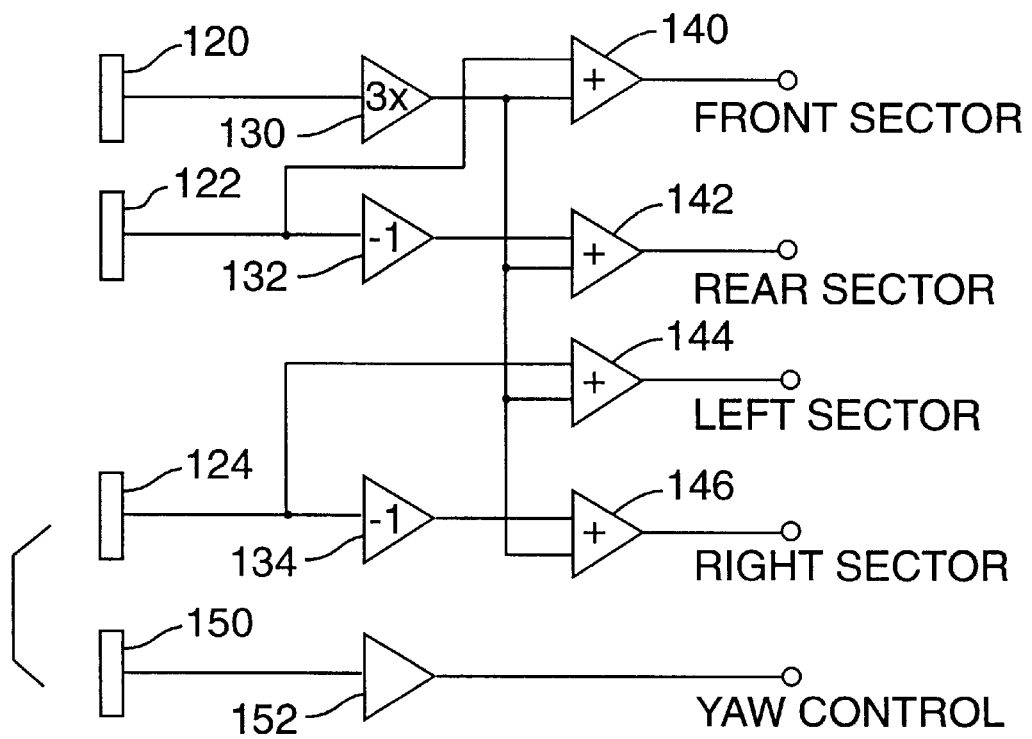
FIG. 5 is a block diagram illustrating an implementation of circuitry for generating speed control signals from control stick inputs.

FIG. 5 is schematic diagram illustrating the circuitry in the controller 60 used to convert user input signals to speed control signals for a four-sector commutator ring design. The remote controller 60 includes two control sticks 110, 112. One is for pitch and roll control and the other is for yaw and collective lift control. The pitch and roll control stick 110 issues front/back (pitch) and left/right (roll) control signals in response to movement of the stick 110 forward and backward, and left and right. The yaw control stick 112 issues left and right yaw signals in response to movement of the stick 112 left and right and issues a collective lift control in response to forward and backward movement. The control sticks 110, 112 are conventional potentiometric joysticks. The outputs to the motors are pulse-width modulated supplies employing darlington power transistors. This implementation of the remote controller uses a 36 volt D.C. power supply for power sent to the sectors in the commutator ring. This power supply can be generated from an AC power source such as standard AC line voltages or from a DC battery pack.

The drives to the four sectors have the two following contributing elements, which are added together:

1. A collective control setting 120 sets the overall lift. This setting increases or reduces all four sectors at the same time.
2. Pitch/roll inputs 122, 124 control opposing sector voltage levels relative to each other to achieve pitch and roll functions. As one sector is increased in the four sector ring, the diametrically opposite sector is reduced by the same amount, preserving overall lift.

The pitch and roll control stick 110 provides two types of inputs: front/back control 122 and left/right control 124. The collective control 120 is connected to an amplifier 130 that provides roughly a gain of 3 (3×). The output of the amplifier 130 is coupled to each sector to produce approximately three times the voltage variation for any stick movement as the pitch/roll signals 122, 124.

To produce equal but opposite speed control signals, the controller 60 uses inverters 132 and 134. The pitch input 122 is connected to a summing amplifier 140 and the inverter 132. The summing amplifier 140 adds the collective signal and the pitch input signal 122 to produce the speed control signal for the front sector. The inverter 132 inverts the pitch input signal 122 and transfers it to another summing amplifier 142. The summing amplifier 142 adds the inverted pitch signal with the collective signal to produce the speed control signal for the rear sector.

The speed control signals for the left and right sectors are generated in a similar way. The roll input signal 124 is connected to a summing amplifier 144 and an inverter 134. The summing amplifier 144 adds the collective signal and the roll input signal 124 to produce the speed control signal for the left sector. The inverter 134 inverts the roll input signal 124 and transfers it to another summing amplifier 146. The summing amplifier 146 adds the inverted roll signal with the collective signal to produce the speed control signal for the right sector.

The yaw motor 42 is powered by a separate supply. The yaw input signal 150 from the yaw control stick 112 is bi-directional, for left or right yaw. This signal is amplified in an amplifier 152 and transferred to the yaw motor 42. The yaw motor 42 is connected to the controller 60 via two wires, one wire carrying the yaw motor power and a second wire carrying the return.

The controller for the three-sector design can be implemented using similar components. The control circuitry is designed to resolve the pitch and roll input signals into three speed control signals as described above. The controller 60 can employ conventional analog, digital or mixed analog and digital control circuitry to generate the speed control signals for the sectors.

While the embodiment in FIG. 1 uses a commutator assembly to provide power to the propeller motors, it is also possible to use other methods to transport power to the propeller motors. The use of a commutator ring has the advantage that power and control are provided in a single wiring path to each motor. The power used to drive the motors is also the control signal for controlling the motor speed.

However, the power for driving the motor and the control for selecting a motor and varying its speed can be sent separately. In one alternative design, each propeller motor could receive power and control signals through separate, fixed slip rings in contact with brushes on the rotor assembly. These slip rings could be oriented in a stacked arrangement (i.e., layered vertically but electrically isolated). The brushes on the rotor assembly would be adjusted to make continuous contact with an associated slip ring during rotation. An encoder could be used to detect the position of the rotor assembly as it spins. The signal reflecting the position of the rotor from the encoder could then be used to select which propeller motor to drive and when to drive it. The controller would vary the speed of the motor in the same manner as above, namely by controlling the magnitude of the power supplied to the motor.

There are a number of ways to detect the position of the rotor assembly using an encoder. One way is to place a disk on the rotor assembly with markings that can be detected via an optical sensor, which in turn, would generate a signal indicating the position of the rotor assembly. Another way is to use an electrical contact in the shape of a ring or disk, in contact with the rotor assembly to detect the position of the rotor and produce a signal indicating that position assembly.

Another way to vary the speeds of the propeller motors at selected positions is to send separate power and control signals through two slip rings: 1) one for sending power and control to each of the propeller motors on the rotor assembly; and 2) another for the return signal. In addition to having a motor, each rotor arm would also be equipped with an electronic switch, responsive to control signals, to control the power provided to the associated motor. The control signals would be generated on the helicopter from encoder logic for detecting the position of the rotor assembly. This encoder logic could be implemented as explained in the previous paragraph.

It is important to note that the motors in the helicopter do not need to be electrical as described above. The motors could be mechanical, such as a combustion engines with throttle control. Control signals generated from detecting the position of the rotor assembly could be used to instruct a throttle control when and how much to change the throttle to vary the propeller speed.

A variety of conventional vertical thrust generators can be used to generate vertical thrust such as propellers (either variable or fixed pitch), ducted fans or jet engines. Thus, while the rotor assembly illustrated in FIGS. 1–4 employs propellers, other thrust generators can be used in place of the propellers.

The rotor assembly in FIGS. 1–4 provides directional control by varying the vertical thrust of the thrust generators (e.g., propellers) at selected rotor positions. Specifically, the implementation varies the vertical thrust by varying the speed of fixed-pitch propellers. There are alternative ways to vary the vertical thrust such as by varying the pitch of the propellers. In this case, the control signals would vary the pitch of the propellers rather than their speed (also, both the speed and pitch of the propellers could be varied to control vertical thrust).

The structure of the rotor assembly can vary also. The rotor assembly does not have to include a series of separate rotor arms extending radially from a hub. The rotor assembly serves as a rotating support structure for the thrust generators, radially distributed around the perimeter of the assembly. This support structure can be constructed in different shapes such as a disc. For example, vertical thrust generators (e.g., propellers, ducted fans, jet engines, etc.) could be radially distributed about the perimeter of a disc.

As noted above, the size and vertical lift of the helicopter can vary substantially. A version of the aircraft illustrated in FIG. 1 capable of carrying a human pilot can be implemented using vertical thrust generators capable of generating sufficient thrust to lift the helicopter and any load that it carries. To generate such vertical thrust, more powerful thrust generators can be used such as combustion engines driving fixed or variable pitch propellers or ducted fans. Jet engines can be used to generate more vertical thrust as well.

In view of the many possible embodiments to which the principles of our invention may be applied, it should be recognized that the illustrated embodiments are only examples of the invention and should not be taken as a limitation on the scope of the invention. Rather, the scope of the invention is defined by the following claims. We therefore claim as our invention all that comes within the scope and spirit of these claims.

We claim:

1. A gyroscopic rotor apparatus for an aircraft comprising:

a rotor assembly including a rotatable support structure and two or more vertical thrust generators radially distributed on the rotatable support structure so that each thrust generator revolves through a path;

wherein the vertical thrust generators are responsive to control signals for varying thrust at any selected position along the path to control flight direction of the aircraft.

2. The apparatus of claim 1 wherein:

each thrust generator includes a propeller for providing upward thrust, and the apparatus including a remote controller for varying the speed of the propellers at selected positions of the thrust generators to control flight direction of the aircraft so that the aircraft can move in any selected direction, irrespective of the position of the controller relative to the aircraft.

3. The apparatus of claim 1 wherein the support structure of the rotor assembly includes a plurality of rotor arms, each arm supporting a thrust generator.

4. The apparatus of claim 2 wherein the remote controller is not located on the aircraft and wherein the controller includes means for permitting an operator to continuously change the direction of the aircraft during flight.

5. The apparatus of claim 2 wherein the remote controller transfers speed control signals for the thrust generators via a tether.

6. The apparatus of claim 3 wherein the thrust generators are electric.

7. The apparatus of claim 2 including a body rotatably coupled to the rotor assembly; wherein the rotor assembly includes a rotor commutator electrically coupled to a thrust generator; wherein the body includes a body commutator for transferring speed control signals from the controller to each thrust generator.

8. The apparatus of claim 7 wherein the body commutator comprises a commutator ring with three or more electrically isolated sectors, each sector corresponding to a selected position along the path through which a thrust generator revolves.

9. A method for controlling a flying object, comprising the steps of:

providing a body;

rotatably mounting a rotor assembly to the body, the rotor assembly having at least two, spaced-apart thrust generators that provide vertical thrust and rotate with the assembly along a path; and varying the thrust applied by at least one of the thrust generators at selected locations along the path thereby to generate a thrust vector for controlling the flight direction of the object.

10. The method of claim 9 wherein the method includes controlling the thrust of the thrust generator at substantially any location along the path, thereby to enable continuous control of the object in any flight direction selected by the user.

11. The method of claim 10 including the step of dividing the path into sectors through which the thrust generators move while rotating with the rotor assembly; and providing signals relating to each sector for varying the thrust of each thrust generator when it is in a position corresponding to the sector.

12. A helicopter comprising:

a rotor assembly including two or more rotor arms, each rotor arm having a propeller for providing vertical thrust;

a controller for varying the speeds of the propellers at rotor arm positions to control flight direction of the helicopter;

wherein the rotor assembly includes an electric motor for each rotor arm to drive an associated propeller;

a helicopter body rotatably coupled to the rotor assembly; wherein the rotor assembly includes a rotor commutator electrically coupled to the rotor motors; wherein the helicopter body includes a body commutator for transferring speed control signals from the controller to the motors on each rotor arm; and wherein the body commutator comprises a commutator ring with three or more electrically isolated sectors, each sector corresponding to a selected rotor arm position.

* * * * *